(12) United States Patent
Adam et al.

(10) Patent No.: US 7,010,728 B2
(45) Date of Patent: Mar. 7, 2006

(54) DATA FILE SEARCH BY EXAMPLE (75) Inventors: Susan C. Adam, Portland, OR (US); Curtis L. Smith, Beaverton, OR (US); Raymond E. Wolf, Vancouver, WA (US); Madhusudan Devineni, Tenali (IN)

(73) Assignee: Tektronix, Inc., Beaverton, OR (US)

( * ) Notice: Subject to any disclaimer, the term of this patent is extended or adjusted under 35 U.S.C. 154(b) by 591 days.

(21) Appl. No.: 10/191,187

(22) Filed: Jul. 8, 2002

(65) Prior Publication Data

US 2004/0006726 A1    Jan. 8, 2004

(51) Int. Cl.
*G06F 11/00* (2006.01)
(52) U.S. Cl. ...................................... 714/57
(58) Field of Classification Search ............... 714/57, 714/45, 39; 707/102, 200, 205; 717/169
See application file for complete search history.

(56) References Cited

U.S. PATENT DOCUMENTS 5,327,341 A * 7/1994 Whalen et al. ............... 705/3
5,577,212 A * 11/1996 Russ ........................... 709/214
6,536,017 B1 * 3/2003 Sanders ........................... 716/3
2002/0138731 A1 * 9/2002 Collamore et al. ......... 713/176
2002/0156552 A1 * 10/2002 Whiting ....................... 700/300
2002/0174140 A1 * 11/2002 Peake et al. ................. 707/500
2002/0175939 A1 * 11/2002 Iwasa .......................... 345/752

* cited by examiner

*Primary Examiner*—Dieu-Minh Le
(74) *Attorney, Agent, or Firm*—Francis I. Gray (57) ABSTRACT

A method of generating reports for data in the form of a multiplicity of data files in an accessible data storage medium uses a user interface to specify a desired report and a sample data file name, the data file names having a variable portion and a non-variable portion. A search algorithm searches the accessible data storage medium for all related data files having the same non-variable portion in their data file names, and logically groups the data files according to the variable portion of their data file names. The related data files are processed according to specified parameters, such as thresholds and limits, and a display is provided of the analysis results, highlighting significant data. The report results with linked data may be stored on an intranet site in an appropriate format to be accessible via a web page using a conventional web browser.

7 Claims, 7 Drawing Sheets

| Events | Reflectance | Summary | | |
|---|---|---|---|---|
| nt Loss [dB] | | Event1 -0.03 to -0.02 KM (Near; Far; Avg) | Event2 3.31 KM (Near; Far; Avg) | |
| cincaz_1310_004. | .00 | 6.68 | n/a | |
| cincaz_1310_004. | 6.68 | 1.00 | n/a | |
| cincaz_1550_004. | .86 | 2.16 | n/a | |
| cincaz_1550_004. | 2.16 | 0.86 | n/a | 0.07 | 0.03 | | 0.05 |
| cincaz_1310_005. | 1.00 | 6.68 | n/a | 0.03 | 0.07 | | 0.05 |
| cincaz_1310_005. | 6.68 | 1.00 | n/a | | | | |
| cincaz_1550_005. | 0.86 | 2.16 | n/a | 0.07 | 0.03 | | 0.05 |
| cincaz_1550_005. | 2.16 | 0.86 | n/a | 0.03 | 0.07 | | 0.05 |

All test for one fiber

FIG.9

| | |
|---|---|
| A_1550_002.50 | 0.142 |
| A_1625_002.50 | 0.156 |
| A_1550_003.50 | 0.167 |

| | |
|---|---|
| | 0.082 |
| | 0.071 |
| | 0.092 |

Good Splice → 0.082
Bad Splice → 0.167

FIG.10

DATA FILE SEARCH BY EXAMPLE

BACKGROUND OF THE INVENTION

The present invention relates to data processing, and more particularly to data file search by example for organizing related data files.

A problem related to organizing related data files is found in the area of time domain reflectometry, and specifically in the area of optical time domain reflectometry (OTDR). Optical cable test evaluation can be a tedious process. It often involves manual evaluation of each cable test looking at each splice location. Newer fiber optic systems use cable bundles having hundreds of fibers. Longer links mean many more splices in each fiber section. Cable tests are run at multiple wavelengths and from alternate ends. This results in hundreds of tests containing thousands of measurements needing to be evaluated and cross-correlated for each link. As an example to see wavelength-dependent optical effects in a 124 fiber cable, the cable is tested at two wavelengths, either 1310 nm/1550 nm or 1550 nm/1625 nm. To get the most accurate measurements the cable is tested from both ends. For installation testing each fiber is tested with an OTDR and a loss test set. 124 fibers×2 wavelengths×2 ends=496 OTDR tests plus 2 loss test set test files, one from each end where each test file has multiple tests. This is 498 separate tests! If the fiber uses 3 km sections between each splice, there are 24 events (splices and connectors) in each OTDR test file and 496 power meter measurements for a 75 km fiber cable. This is 496 (OTDR)×24 (events)+496 (loss test set)=2480 separate measurements to evaluate! This problem becomes worse for longer links (more events) and higher fiber counts. This task is done at installation and at any time the system is upgraded or reconfigured.

Evaluating literally thousands of optical cable measurements becomes a bottleneck in trying to install and upgrade fiber systems to handle the huge increase in bandwidth needed for today's network operations. Fiber report software has been used to generate test reports for a few years. However most software packages lack a way to correlate different tests for the same fiber, and at the same time allow detailed analysis of problem measurements. Manually identifying hundreds of files and the relationship between different files is time consuming and tedious.

What is desired is report software for integrating the functions of report generation, evaluation and analysis of large numbers of related data files, such as those representing large numbers of fiber optic cable tests.

BRIEF SUMMARY OF THE INVENTION

Accordingly the present invention provides a data file search by example technique that accesses a data storage medium having data representing multiple measurements. A user interface allows a user to interact with a report generation program to identify a desired report type and to specify a sample data file name, the data file names having a variable portion and a non-variable portion. A search is conducted in the accessible data storage medium for data file names having the same non-variable portion, and the resulting data files are correlated by logical groupings based on the variable portions to produce a set of related data files. The related data files are analyzed according to specified thresholds and limits, and the analytical results are presented in a display of summary results on the user interface. The data files and resulting report may be stored on a web site server for access by others using standard web browsers.

The objects, advantages and other novel features of the present invention are apparent from the following detailed description when read in conjunction with the appended claims and attached drawing figures.

DETAILED DESCRIPTION OF THE INVENTION

In collecting a large amount of data for multiple devices under test, such as fibers in a fiber optic cable, file naming is usually consistent. For example field technicians really don't want to generate unique file names while acquiring test results. They want to ease sorting later, and most test equipment, such as the NetTek™ OTDR manufactured by Tektronix, Inc. of Beaverton, Oreg., aids consistent naming schemes. The following data file search technique is based on this name consistency to quickly locate and cross-correlate test files. The key is an interface where a user selects a sample file name for each category based on the type of report the user wants. The following discussion is based on the fiber optic cable example discussed above.

Figure 1:
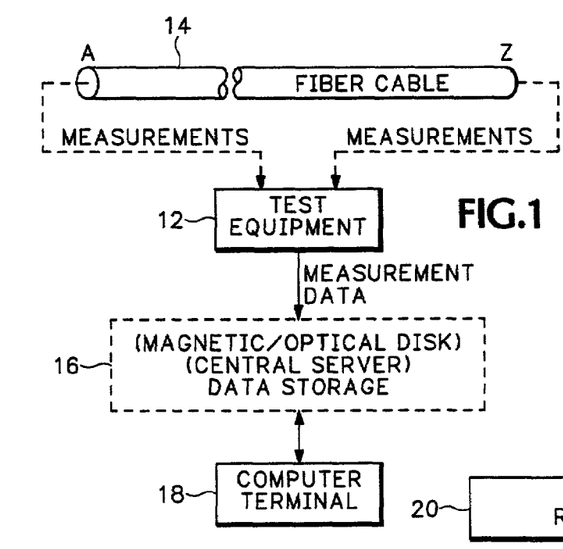
FIG. 1 is conceptual view of a representative data measurement and report generation according to the present invention.

As shown in FIG. 1 the data that is measured by test equipment 12 for a fiber cable 14, for example, may be downloaded to a magnetic or optical disk, a central server or other accessible data storage medium 16. An optical OTDR and an optical power meter, which may be incorporated into a single instrument 12, takes measurements of each fiber of the fiber cable 14 from opposing ends and at different frequencies. Each measurement is given a file name according to a consistent file naming scheme. For example the file naming parameters may include a location, direction, wavelength and fiber number for the measurement—cinc_az_1310_004.sor. Corresponding files would have similar file names—cinc_za_1310_004.sor, cinc_az_1550_004.sor, etc. The accessible data storage medium 16 may then be accessed by a computer terminal, personal computer or other data processing device 18 for analysis and report generation according to the present invention.

Figure 2:
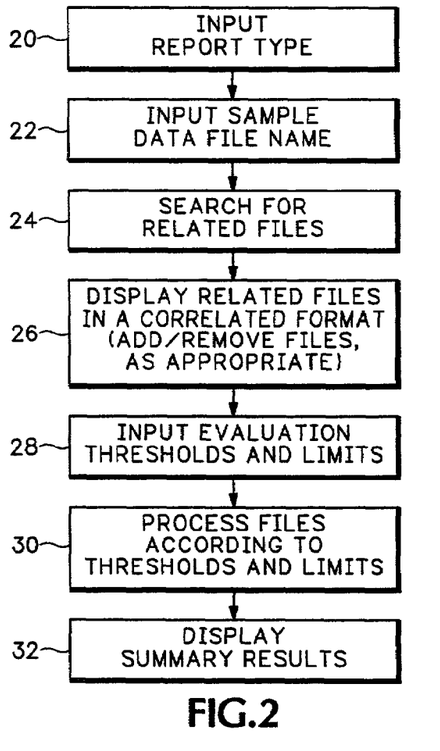
FIG. 2 is a flow diagram view of report generation according to the present invention.
Figure 3:
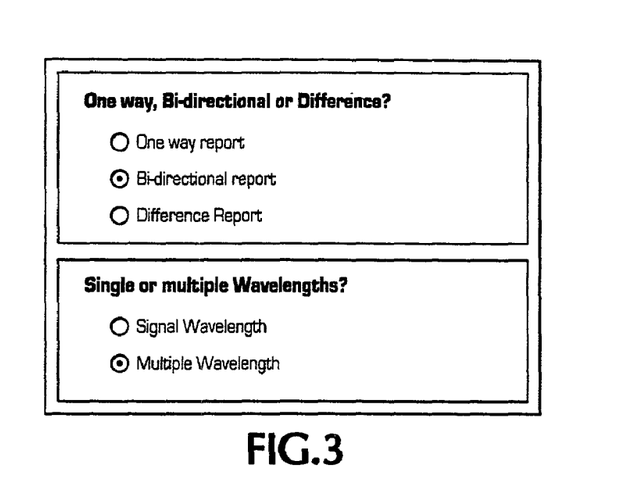
FIG. 3 is a plan view of a user interface for specifying a report type according to the present invention.
Figure 4:
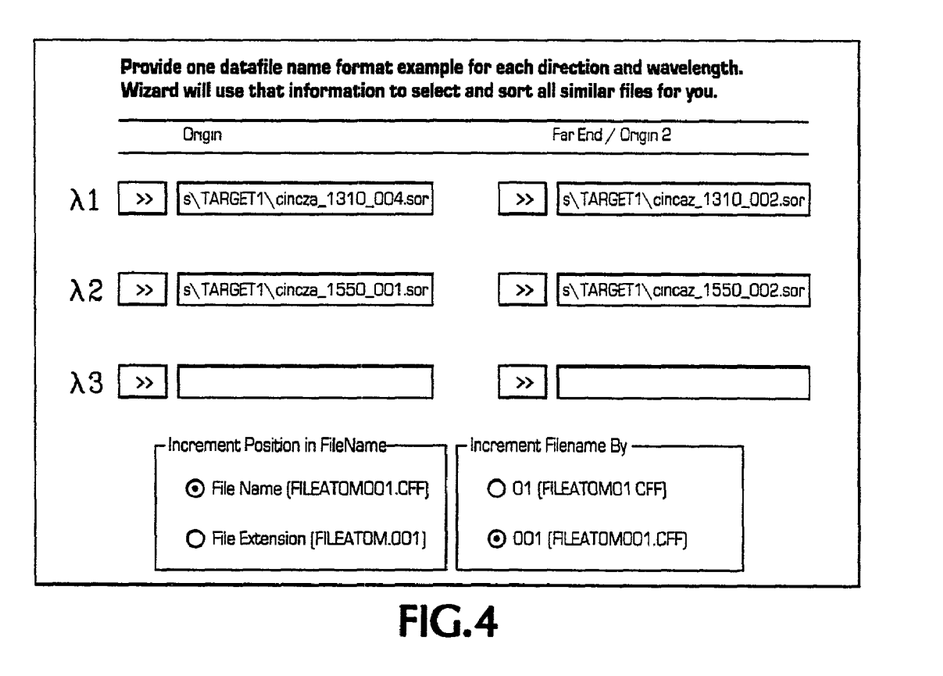
FIG. 4 is a plan view of a user interface for specifying a sample data file name according to the present invention.

Referring now to FIG. 2 in a first step 20 a user inputs parameters to specify what type of report is desired. An interactive user-interface (UI), such as that shown in FIG. 3, may be used. In this example a multiple wavelength, bi-directional report is specified. Other alternatives include a one-way report, where only data measurements obtained from one end of the fiber cable are used, and a difference report, where data measurements obtained are compared with a prior set of data measurements to see what degradation has occurred over time. In the next step 22 the user is prompted to enter a sample file name for each category. A suitable UI is shown in FIG. 4. The number of sample file names needed is based on the number of dimensions required to create the specific report. If you have two wavelengths and two directions, there are 4 sample file names as shown. Also the fiber number may be part of the file name or the extension, and may be a two or three digit number. Therefore the user may indicate this information as well to assist in the correlation search that follows. This is more intuitive than sometimes obscure DOS wild card characters and much faster than individually selecting all the files in the report.

Based on the sample file names, the software builds a report list and sorts the list, showing correlations between test files as indicated in the next step 24. The search algorithms compare the sample file names to extract key parameters needed to locate and correlate the files, such as:

Differences in names between wavelengths are extracted from comparing the sample file names in the columns Position and increment of the individual fibers are gathered from the information boxes The remainder of the sample file name is used to search for similar files.

Figure 5:
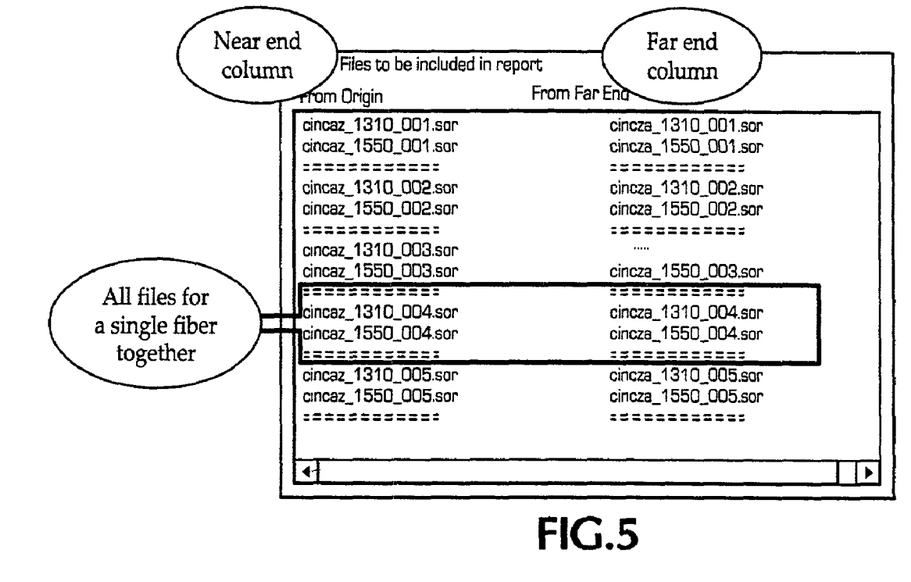
FIG. 5 is a plan view of a user interface identifying the data file names related to a sample data file name according to the present invention.
Figure 6:
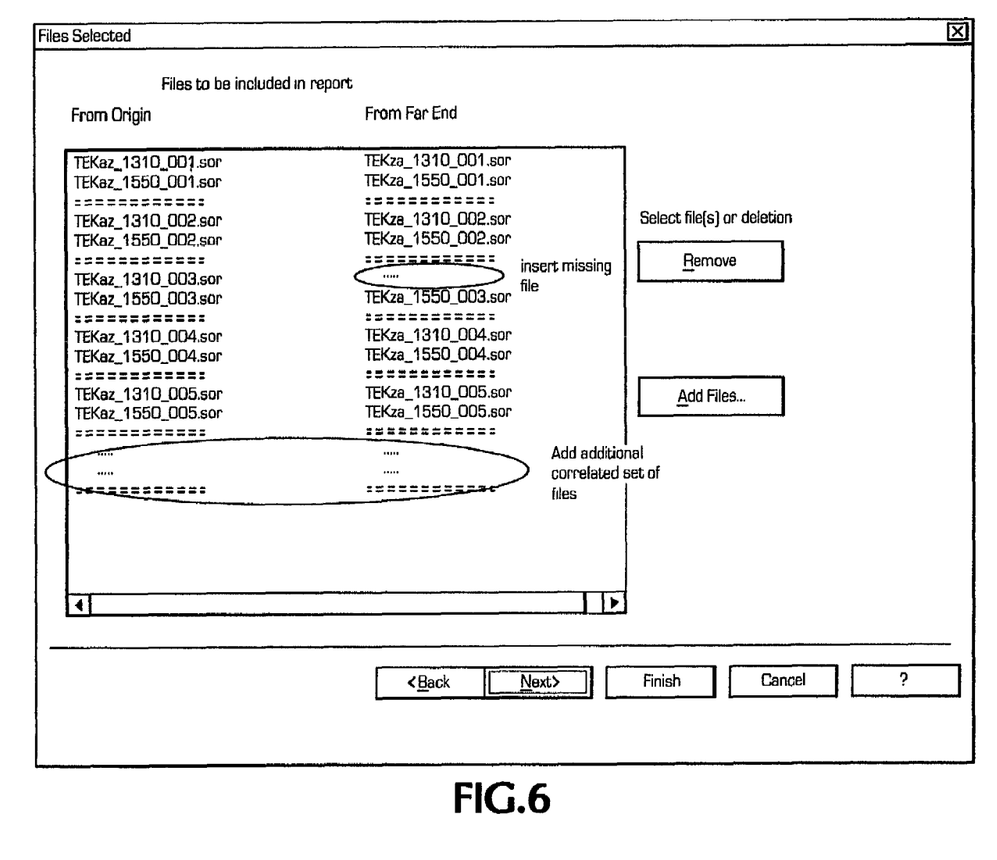
FIG. 6 is a plan view of a user interface indicating locations where data file names related to a sample data file name may be added/removed according to the present invention.

In other words the variable part of the sample file name is separated from the non-variable part, and the search algorithm automatically looks for data file names matching the non-variable part of the sample file name using simple string manipulation routines. The result is a display of correlated data files in step 26, as shown in FIG. 5. In this case near end data files are located in one column and far end data files are located in a second column with the same wavelengths on the same row and all the data files for a particular fiber of the fiber cable are grouped together. In this instance the location cinc is non-variable, the az or za indicates either a near end or far end measurement data file, the number 1310 or 1550 indicates the wavelength at which the measurement was taken, and the remaining numeral indicates the fiber number within the fiber cable. For any missing files a placeholder mark is inserted. Also provision is made for adding an additional correlated set of files, as shown in FIG. 6, if the search missed them. The user may "click" on the appropriate mark to find a list of files that are close in name in case the file was mislabeled or missed, i.e., a "-" was used instead of a "_" in identifying the file during measurement. If the missing file(s) is found from the list of similar files, the name(s) may be corrected and the file(s) inserted in lieu of the placeholder mark(s). Where an additional correlated set of files is added, another set of blanks or place marks is added to the bottom of the list so that the user can add any number of missed files into the correlated file list. Likewise the user may delete or remove any of the included files as appropriate. Thus this step 26 locates all the data files in the accessible data storage medium 16 that are to be included in the report and groups them together in a logical manner.

Figure 7:
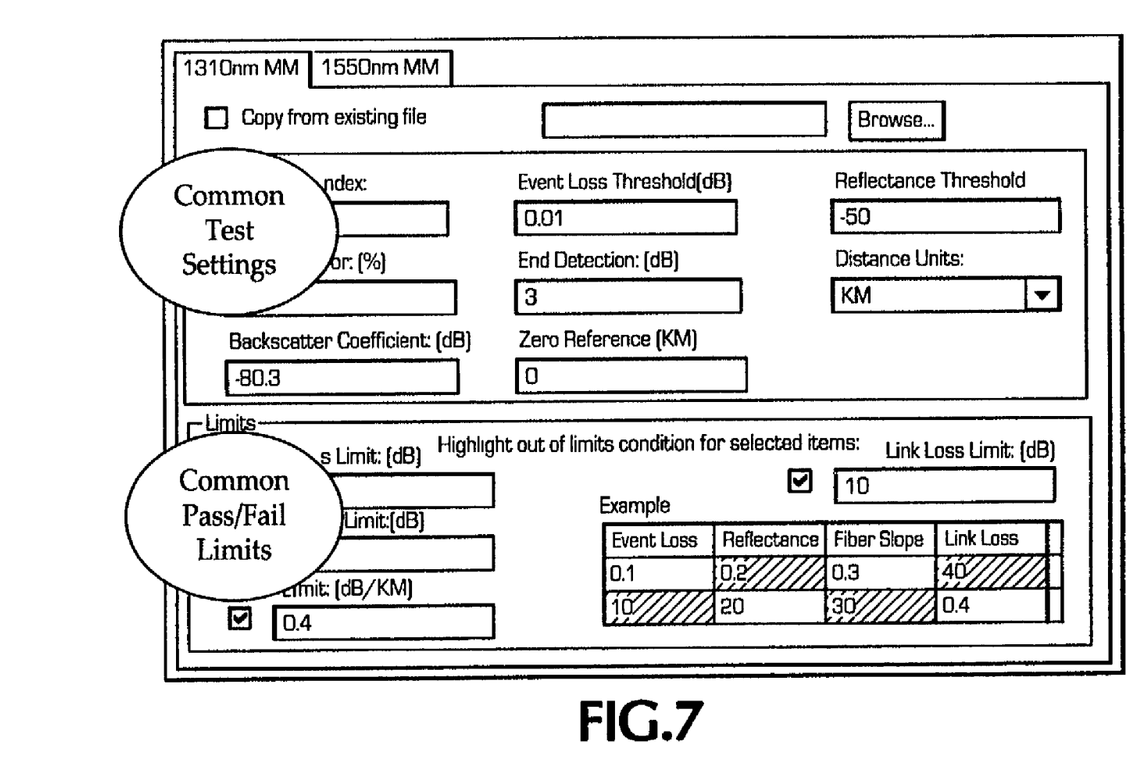
FIG. 7 is a plan view of a user interface illustrating thresholds and limits for analyzing data according to the present invention.

The grouping continues through a report generation process to maintain the file matching in a final report. This allows visual comparison of all applicable test results in the selected fiber. As the test files are cross-matched, parameters and analysis thresholds have to be considered. During analysis if the test parameters and pass/fail limits are not consistent, the differences seen in the report may be differences in setup, not in measurements. The report file search also checks which wavelengths are present in the sample files. Based on that information, the user may choose in the next step 28 to apply a single set of test parameters and apply a consistent set of pass/fail limits, as shown in the display of FIG. 7. The thresholds serve to eliminate events during the analysis that are not significant, while the limits serve to indicate those events that are very significant. This display may include an example of representative in-limit and out-of-limit values with an appropriate color code for the out-of-limit values.

Figure 8:
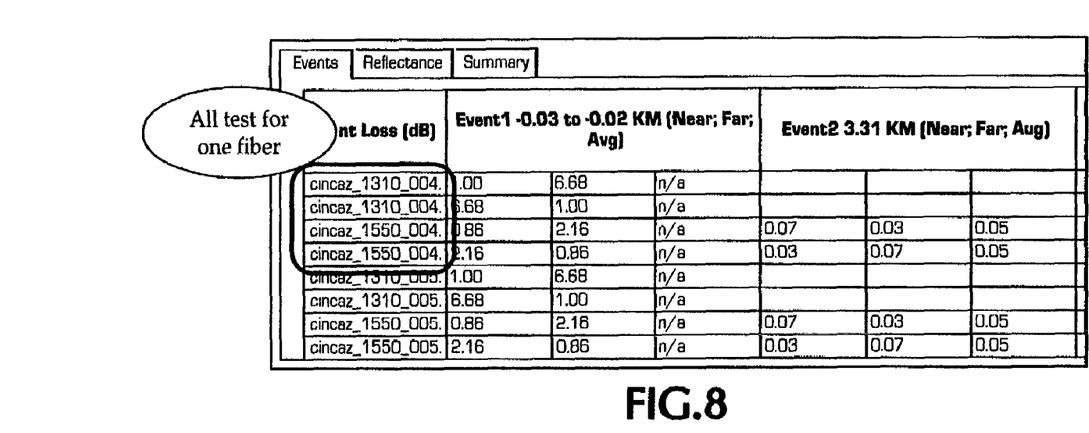
FIG. 8 is a plan view of a user interface presenting report results according to the present invention.
Figure 9:
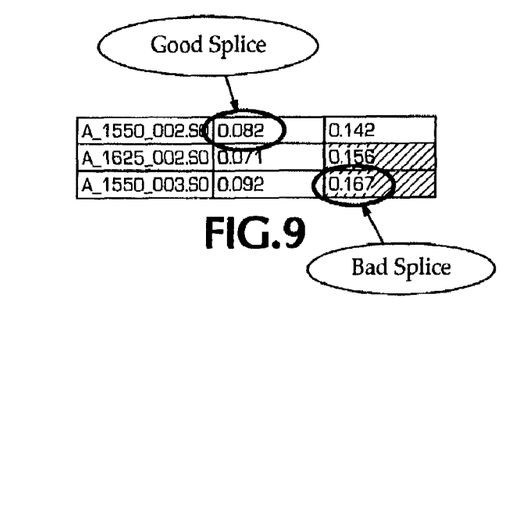
FIG. 9 is a plan view of a subset of a user interface illustrating out-of-limits alarms according to the present invention.

Once all the files are located, cross-matched, parameter-matched and automatically analyzed in step 30, the results are presented, as shown in FIG. 8, for fast analysis in step 32. Intelligent file search and sort combined with integrated analysis reduces time to generate the report to just a few minutes. Matching the pass/fail limits highlights problem areas in a consistent manner. This allows the entire fiber bundle to be checked for problems at just a glance in a display as shown in FIG. 9, where a portion of a display similar to that of FIG. 8 is shown indicating that at event X a couple of measurements identify a bad splice, i.e., the reflectance is greater than a threshold, such as 0.150. The report highlights the points of interest, i.e., the parts of the fiber system that violate the pass/fail limits. To access the detailed data in the original test file, the user "clicks" on the point of interest. The cells in the report may be hyperlinked to advanced data view and measurement software. By linking the report to the data the user may view to any depth needed to analyze the system.

Figure 10:
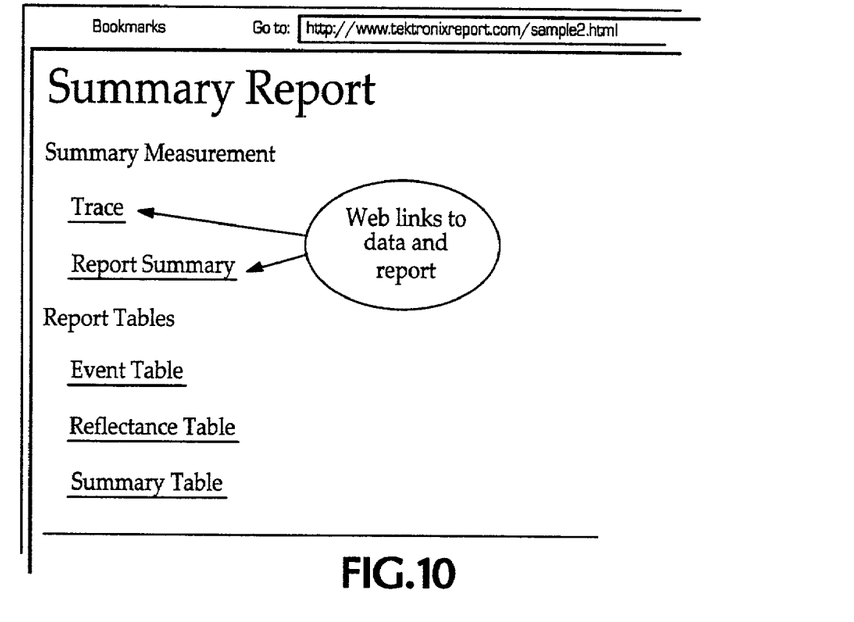
FIG. 10 is a plan view of a user interface for accessing a web site according to the present invention.

Once a report is generated and initial analysis completed, there is still need to refer to the original data. Test data is used for maintenance, evaluation if a line can carry a higher rate signal, and restoration. The cross-referenced report is an excellent tool to access the files. By "hyperlinking" the report and individual data analysis together, the report itself becomes the test database front end. The file matching and linked test data are important pieces of information needed for network maintenance and upgrade evaluation. With the final report compiled, the information may be disseminated to all that might need it. To do this and keep the matching and linkage, linking data is part of the interface—a web page. Outputting data to a web page allows the user to keep data accessible for internal operations by placing the data on an intranet site. Presenting the data as web-compatible files also eliminates the need for special data viewers. In this case the graphics from OTDR Trace files are output as JPG files and the report as HTML tables. This allows viewing of trace data and summary reports with any web browser. If access is needed to the original raw data, it may be linked to the pages to allow download for use in the test equipment or in specialized trace viewers, as shown in FIG. 10.

Thus the present invention provides a data file search by example technique for sorting and calibrating large amounts of related test data, such as fiber cable test data, making the resulting correlated data easier to view and analyze for problems, and outputting it in a way that makes the results readily accessible to anyone doing system maintenance/upgrades.

What is claimed is:

1. A method of generating a report from a multiplicity of data files in an accessible data storage medium, each data file having a unique data file name with a variable portion and a non-variable portion, comprising the steps of:
   inputting a sample data file name having a sample variable portion and a sample non-variable portion via a user interface;
   searching for the data files from the accessible data storage medium having the non-variable portion in the unique data file names equivalent to the sample non-variable portion to generate a set of related data file names;
   displaying the set of related data file names in a correlated format according to the variable portion of the unique data file names corresponding to the sample variable portion;
   analyzing data linked to the set of related data file names according to specified parameters; and
   displaying summary results from the analyzing step for the set of related data file names via the user interface as the report.

2. The method as recited in claim 1 further comprising the step of adding/removing data file names to adjust the set of related data file names for missing or extraneous related data file names prior to the analyzing step.

3. The method as recited in claim 1 further comprising the step of setting limits and thresholds as the specified parameters prior to the analyzing step.

4. The method as recited in claim 1 further comprising the step of highlighting out-of-specification data in the summary results as a function of the specified parameters.

5. The method as recited in claim 4 further comprising the step of linking the out-of-specification data with the linked data in the corresponding data files for detailed analysis.

6. The method as recited in claim 1 further comprising the step of defining a report type via the user interface to delimit the unique data file names for the searching and analyzing steps.

7. The method as recited in claim 1 further comprising the step of converting the summary results and linked data to an appropriate format for storage on a network node that is accessible via a web page with a web browser.

* * * * *